(12) United States Patent
Ayres

(10) Patent No.: US 7,253,570 B2
(45) Date of Patent: Aug. 7, 2007

(54) AUTOMATIC MOMENTARY SECONDARY LIGHT SOURCE ASSEMBLY

(76) Inventor: John Alfred Ayres, 186 Briarwood Dr., Lapeer, MI (US) 48446

(*) Notice: Subject to any disclaimer, the term of this patent is extended or adjusted under 35 U.S.C. 154(b) by 236 days.

(21) Appl. No.: 10/935,769

(22) Filed: Sep. 8, 2004

(65) Prior Publication Data
US 2005/0087675 A1    Apr. 28, 2005

Related U.S. Application Data

(60) Provisional application No. 60/501,106, filed on Sep. 8, 2003.

(51) Int. Cl.
*H05B 37/02* (2006.01)
(52) U.S. Cl. .................. 315/308; 315/360; 315/313
(58) Field of Classification Search .......... 315/80, 315/82, 88, 89, 121, 152, 153, 155, 149, 315/291, 312, 360, 362, 307, 308, 313; 307/38, 307/39, 64, 85, 86; 340/309.15; 362/227, 362/235, 236, 254
See application file for complete search history.

(56) References Cited

U.S. PATENT DOCUMENTS

| | | | | |
|---|---|---|---|---|
| 4,198,563 A * | 4/1980 | Elssner | ................. | 250/214 AL |
| 4,376,909 A * | 3/1983 | Tagami et al. | ................ | 315/82 |
| 4,613,791 A * | 9/1986 | Kurihara et al. | ............. | 315/82 |
| 5,471,052 A * | 11/1995 | Ryczek | ...................... | 250/226 |
| 5,666,028 A * | 9/1997 | Bechtel et al. | ................ | 315/82 |
| 5,952,793 A * | 9/1999 | Nishi et al. | .................. | 315/307 |
| 6,016,038 A * | 1/2000 | Mueller et al. | ............. | 315/291 |
| 6,053,622 A * | 4/2000 | Horowitz et al. | ........... | 362/276 |
| 6,659,622 B2 * | 12/2003 | Katogi et al. | ............... | 362/219 |
| 6,774,367 B2 * | 8/2004 | Stephan et al. | ............ | 250/330 |
| 6,828,544 B2 * | 12/2004 | Stephan et al. | ....... | 250/214 VT |
| 6,966,681 B2 * | 11/2005 | Stephan et al. | ............ | 362/464 |
| 2004/0036586 A1 * | 2/2004 | Harooni | ...................... | 340/435 |
| 2004/0051466 A1 * | 3/2004 | Liu | ........................... | 315/149 |
| 2005/0122064 A1 * | 6/2005 | Chevalier et al. | .......... | 315/291 |

* cited by examiner

*Primary Examiner*—Thuy Vinh Tran
(74) *Attorney, Agent, or Firm*—Clark Hill PLC

(57) ABSTRACT

A secondary light assembly emits light into an area lit by a primary light source. The secondary light assembly includes a light sensor for sensing light emitted from the primary light source. A secondary light source is operatively connected to the light sensor. A controller is electrically connected to the light sensor and the secondary light source. The controller calculates a rate of change of light emission from the primary light source such that the controller turns the secondary light source on when the rate of change of light emission from the primary light source is above a predetermined rate threshold.

18 Claims, 13 Drawing Sheets

AUTOMATIC MOMENTARY SECONDARY LIGHT SOURCE ASSEMBLY

This patent application claims the benefit of a prior-filed patent application having Ser. No. 60/501,106 filed Sep. 8, 2003.

BACKGROUND ART

1. Field of the Invention

The invention relates to assemblies used as night lights. More specifically, the invention relates to light assemblies that are used only momentarily after a light source is turned off.

2. Description of the Related Art

Devices are well known that provide some level of light for an area automatically upon certain conditions. In the past, lights were automatically turned on based upon a clock setting. In other devices, lights turned on when ambient light was reduced to a level below which a secondary light source was turned on. Some of these devices are commonly referred to as "night lights" because they stay on to provide a minimal amount of light all during the night allowing those that need to get up to move about the room without running into objects.

U.S. Pat. No. 4,198,563 discloses a modified light assembly. The circuit disclosed in this patent energizes a secondary light source when ambient light is reduced below a predetermined level. When the circuit is activated by the reduced ambient light, a timer is activated to govern how long the secondary light source is to be lit. More specifically, a timing circuit provides a reset input for an SR flip-flop that determines for how long the secondary light is supposed to stay on once a photo-detector sets the flip-flop when ambient light drops below the predetermined level.

This is a fair representation of most supplemental light sources in that they are activated after the ambient light drops below a predetermined level. In essence, they are more concerned about providing light when ambient light is reduced. Not only that the ambient light is reduced, but that it is reduced to or below what has been determined to be a fair representation of a condition that requires supplemental light emission for human activity. While light may be needed in these circumstances, there is no device that provides momentary illumination in a space or room that is triggered by an event defined by the rate at which ambient light is reduced.

SUMMARY OF THE INVENTION

A secondary light assembly emits light into an area lit by a primary light source. The secondary light assembly includes a light sensor for sensing light emitted from the primary light source. A secondary light source is operatively connected to the light sensor. A controller is electrically connected to the light sensor and the secondary light source. The controller calculates a rate of change of light emission from the primary light source such that the controller turns the secondary light source on when the rate of change of light emission from the primary light source is above a predetermined rate threshold.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
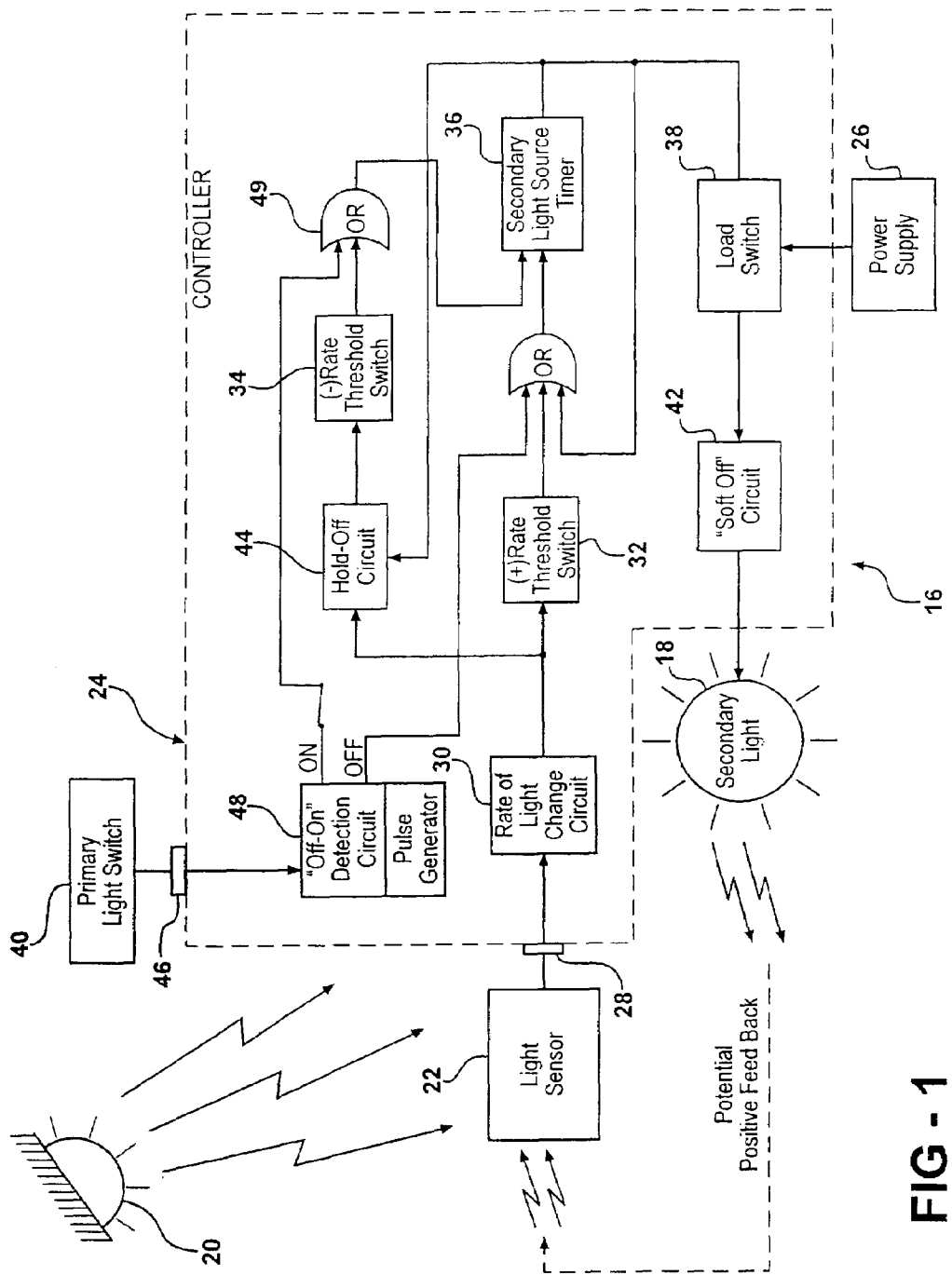
FIG. 1 is a block diagram of one embodiment of the invention.

Referring to FIG. 1, a first embodiment of the invention, a secondary light assembly, is generally indicated at 16. The secondary light assembly 16 emits light out of a secondary light source 18. The secondary light assembly 16 controls the secondary light source 18 to emit radiation in the visible portion of the electromagnetic spectrum with sufficient amplitude to allow an occupant of a space to see should the occupant be required to do something after a primary light source 20 is extinguished. While a primary purpose of the secondary light assembly 16 is to act as what is commonly referred to as a "night light," it should be appreciated by those skilled in the art that the secondary light assembly 16 may be used in any environment where an occupant may need to see in a space after the primary light source 20 is extinguished or turned off.

The secondary light assembly 16 includes a light sensor 22. The light sensor 22 senses ambient light produced by the primary light source 20. Although the primary light source 20 is discussed herein as a single source, it should be appreciated that the primary light source 20 may be a plurality of sources whose outputs combine for an overall ambient light. In this manner, the first embodiment of the invention 16 does not differentiate as to whether a space or room is darkened by first turning an overhead electric light source off or by closing a bind over a window—all that matters is the last remaining primary light source 20 provides a sufficient amplitude of light to be sensed by the light sensor 22.

The secondary light assembly 16 further includes a controller, generally shown at 24. The controller 24 is electrically connected to the light sensor 22 and the secondary light source 18. The controller 24 calculates a rate of change of light emission from the primary light source 20 such that the controller 24 turns on the secondary light source 18 when the rate of change of light emission from the primary light source 20 is below a predetermined rate threshold. More specifically, the controller 24 is electrically connected between the light sensor 22 and the secondary light source 18. When the controller 24 detects a reduction in ambient light at such a rate that would indicate the occurrence of an event, i.e., turning the lights out, it would direct the secondary light source 18 to illuminate and emit light (visible spectrum). Because the secondary light assembly 16 measures a rate of change, as opposed to an absolute amplitude, e.g., a sunset, it will reduce energy consumption from a power supply 26, discussed subsequently, due to its usage only in the probable presence of occupants who need the supplemental light to exit the room or safely reach a destination within the room.

The controller 26 receives an input from the light sensor 22 at port 28. The input is received by the rate of light change circuit 30 may be a voltage level or a current level that is proportional to the amount of light falling on the light sensor 22 from the primary light source 20. The rate of change, as a function of time, of this input is sensed by the rate of light change circuit 30 is proportional to the level of light being reduced by the primary light source 20.

The output of the rate of light change circuit 30 is used to trigger one of rate threshold switches 32, 34. These are the positive rate threshold switch 32 and the negative rate threshold switch 34. These switches 32, 34 are responsive to the output of the rate of light change circuit 30, having reached a predetermined threshold level. Thus for low rates of change of light intensity, no output occurs from the rate threshold switches 32, 34. Such would be the case for normal sun-up and sun-down events. Therefore, the night light would not be activated by the natural daylight cycle. A sudden decrease in visible ambient light from the primary light source 20 will, however, cause an output pulse from the positive rate threshold switch 32. This will turn on a secondary light source timer 36, which latches on for a fixed period of time. When on, the secondary light source timer 36 throws a load switch 38, which connects the power supply 26 to the secondary light source 18.

The sudden rate of change in output from the primary light source 20 would typically be at the rate that a room light would go out after being turned off by a primary light switch 40. The rate of light change circuit 30 can also require that the primary light source 20 be on for a predetermined length of time before it can be activated. This can prevent unwanted external visible ambient light sources, such as lightening, and passing vehicle headlights from turning on the secondary light assembly 16.

When the secondary light source timer 36 times out, the load switch 38 turns off the secondary light source 18. The secondary light source timer 36 will automatically reset and wait for the next detection of a rate threshold transition by the light sensor 22, whereafter it will be triggered again.

The secondary light assembly 16 includes soft off circuit 42 that delays the actual shut off of the secondary light source 18 for a few seconds. During this time, the soft off circuit 42 gradually dims the secondary light source 18 until it is completely off. This type of stepped or ramped down turn off provides some warning that the secondary light source 18 is about to go out and, as such, may be psychologically pleasing. Additionally, should the secondary light source 18 emit light within the same portion of the spectrum of electromagnetic radiation that is sensed by the light sensor 22, the soft off circuit 42 will reduce the rate at which the light is being reduced within the space being lit, preventing feedback into the controller 24 by the secondary light source 18, which would prevent the secondary light assembly 16 from operating properly. It should be appreciated by those skilled in the art that the secondary light source 18 can be selected such that the light emitted thereby is outside the sensed portion of the spectrum by the light sensor 22, eliminating the necessity of the soft off circuit 42. In this instance, the soft off circuit 42 would only be incorporated as an added feature and not a requirement of the controller 24.

Returning attention to the negative rate threshold switch 34, a sudden increase in the ambient light, such as turning on the primary light source 20 when the room is already dark, will cause the negative rate threshold switch 34 to output a pulse if it's threshold is exceeded. The negative rate threshold switch 34 will only produce an output pulse if a hold-off circuit 44 is not active. The hold-off circuit 44 will be discussed in greater detail subsequently. The pulse output from the negative rate threshold switch 34 will reset the secondary light source timer 36 and turn off the load switch 38 as well as the secondary light source 18. Therefore, if the secondary light source 18 is on and the primary light source 20 is also turned on, the secondary light source 18 turns off. This function is particularly useful if the power supply 26 is a battery, which will aid in the conservation of energy.

The hold-off circuit 44 is controlled by the output of the secondary light source timer 36. When the secondary light source timer 36 first turns on, the hold-off circuit 44 is activated for a short period of time to prevent any negative rate signal from the rate of change circuit 30 from triggering the negative rate threshold switch 34. This prevents resetting the secondary light source timer 36 and turning the secondary light source 18 off again. Thus, the adverse effect of positive feedback from the secondary light source 18 to the light sensor 22 is prevented by activation of the hold-off circuit 44 when the secondary light source 18 is turned on. The hold-off circuit 44 may be in the form of a timed switch activated by the output of the secondary light source timer 36. The time period for this switch is very short allowing the secondary light source 18 to reach a steady state light output before the hold-off circuit 44 enables the negative rate threshold switch 34. When the hold-off circuit 44 is not active and the secondary light source 18 is on, turning the primary light source 20 back on will turn off the secondary light source 18.

The secondary light assembly 16 has an alternative input. The primary light switch 40 for the primary light source 20 can active the secondary light assembly 16 by sending an on/off signal through a second input port 46. The on/off signal is sent to an on/off detection circuit 48, which senses the switching of the primary light switch 40, on and off, and outputs an "on" pulse and an "off" pulse, respectively. The "on" pulse, passes through an OR gate 49, and directly resets the secondary light source timer 36 to turn off the secondary light source 18 should the primary light source 20 be turned back on while the secondary light source 18 is still on. Conversely, the "off" pulse starts the secondary light source timer 36, which turns on the load switch 38, connecting the secondary light source 18 to the power supply 26. It is important to note that the primary light switch 40 is only "sensed" by the controller 24 and does not directly activate the secondary light source 18. Therefore, turning on the secondary light assembly 16 does not require any extra steps or effort and occurs automatically with the normal activation of the primary light switch 40. Likewise, it is important to note that the secondary light source timer 36, activated by sensing the primary light switch 40, turns on the secondary light source 18 for a timed period.

Figure 2:
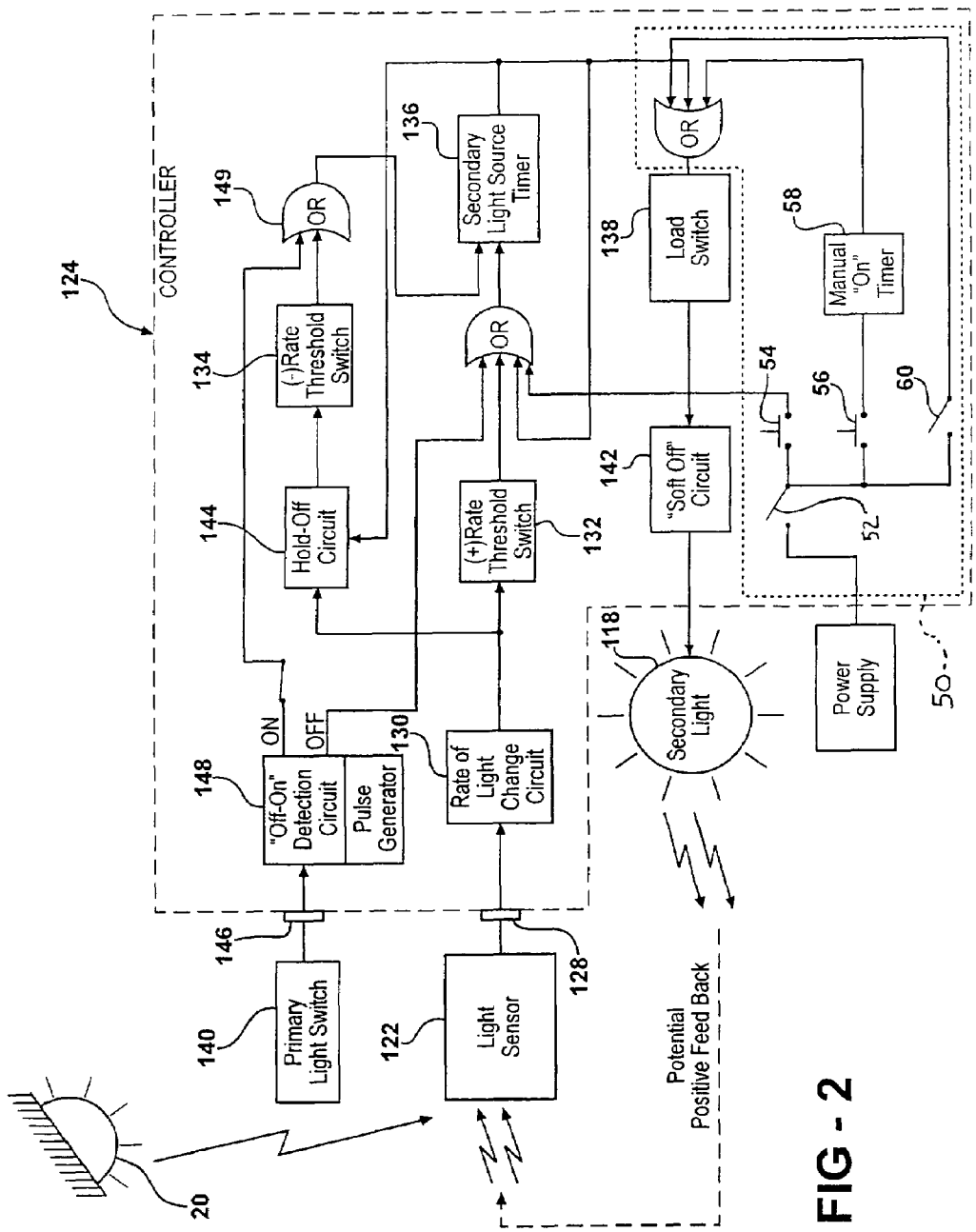
FIG. 2 is a block diagram of a second embodiment of the invention.

Referring to FIG. 2, a second embodiment of the invention is shown, with elements similar in function to those discussed above for the first embodiment have reference characters offset by 100 from those of the first embodiment. The second embodiment of the secondary light assembly 116 is identical to that of the first embodiment shown in FIG. 1 with the exception of the added auxiliary functions, generally shown at 50. An on/off main power switch 52 may, depending on the configuration of the embodiment, manually turn the secondary light assembly 116 on and off. A normally open momentary switch 54 manually initiates the secondary light source timer 36 and turn on the secondary light source 118 for the normal timed period because, at times, it is useful to reinitiate the secondary light source 118 in a dark area or room.

A normally open momentary contact switch 56 manually starts a manual timer 58 that turns on the secondary light source 118 for a longer period of time than the normal secondary light source timer 136. This feature is useful when a person requires light, in an already darkened area or room, to perform a task that requires more time than is provided by the secondary light source timer 136. And finally, a normally open switch 60 provides continuous activation of the secondary light source 118 until it is opened. This provides a flashlight type of function.

Figure 3:
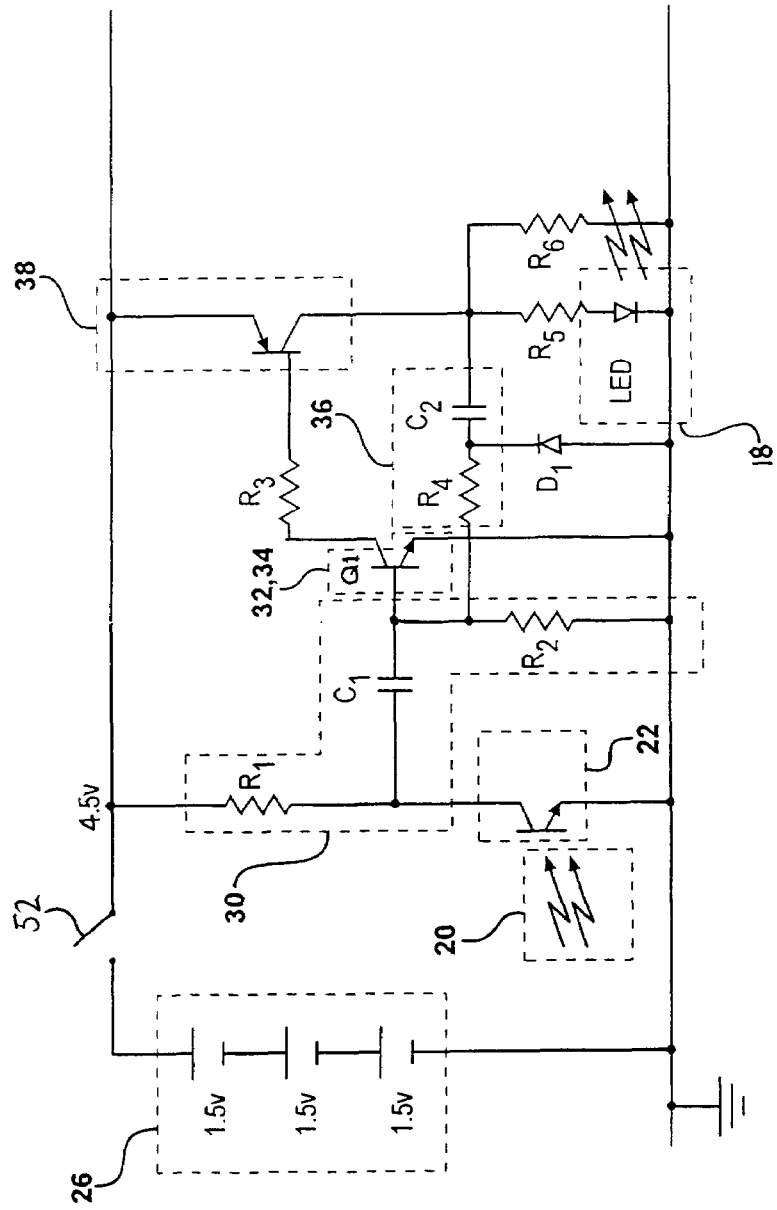
FIG. 3 is an electrical schematic of the first embodiment of the invention.

Referring to FIG. 3, an electrical schematic of the embodiment of FIG. 1 is shown. It is a secondary light assembly 16 utilizing a single LED as the secondary light source 18. The power supply 26 is 4.5 volts DC, made up from 3 AAA alkaline battery cells. The switch 52 connects the power supply 26 to the controller 24. The preferred LED provides white or blue light but it could be any color. The light sensor 22 is a phototransistor. The peak sensitivity of the phototransistor is in the infrared region, but it is also sensitive to visible light. FIG. 3 illustrates an embodiment that does not incorporate the use of the primary light switch 40 or a signal generated therefrom, as is shown in FIG. 1. This secondary light assembly 16 responds only to a time rate of change in ambient light and not to the absolute level of light. The values of a first resistor R1, a second resistor R2, a first capacitor C1, and the sensitivity of light sensor 22 determine the required rate of change of the ambient light intensity required to turn the secondary light source 18 on. When a sudden decrease in ambient light level occurs and the primary light source 20 is initially dimmed, a current is injected into the base of a first transistor Q1 sufficient to turn the first transistor Q1 and a second transistor Q2 on. The secondary light source 18 is then connected to the power supply 26 through the second transistor Q2 and a third resistor R5, resulting in the application of approximately 30 milliamps being sent through the secondary light source 18. This provides light sufficient to illuminate a large room, but dimly compared to the normal room ambient light.

At the same time that the secondary light source 18 turns on, a timing function begins. A second capacitor C2 and a fourth resistor R4 provide momentary feedback to the base of the first transistor Q1, which maintains the light source 18 on until the feedback circuit times out; e.g., when the second capacitor C2 fully charges. When the second capacitor C2 becomes sufficiently charged, the first transistor Q1 is cut off and the secondary light source 18 turns off. The timer described here provides about 45 seconds of momentary light from the secondary light source 18.

When the secondary light source 18 is extinguished, the second capacitor C2 rapidly discharges through a fourth resistor R6 and a first diode D1 to quickly reset the secondary light assembly 16 for its next operation in case the primary light source 20 is cycled on and off again. In the dark, the first capacitor C1 slowly discharges through the light sensor 22 and the second resistor R2. When the primary light source 20 is turned on and the first capacitor C1 is not yet fully discharged, the light sensor 22 turns on and rapidly completes the discharge of the first capacitor C1. Also, when the secondary light source 18 is on and the primary light source 20 is turned back on, the light sensor 22 switches the positive side of the first capacitor C1 to ground causing the base of first transistor Q1 to go negative, immediately turning off the secondary light source 18, conserving the energy in the power supply or batteries 26.

The secondary light source 18 shown in FIG. 3 does not emit significant infrared radiation (compared to ambient light) to cause the light sensor 22 (an infrared phototransistor in this embodiment) to switch on when the secondary light source 18 turns on. This prevents the controller 24 from self turn-off and oscillation. Likewise, when the secondary light source 18 turns off, it does not trigger a turn on cycle nor cause oscillation thereof. Because of the combination light sensor 22 and light used as described in this embodiment, the other auxiliary functions are not required to prevent malfunctions of the secondary light assembly 16 due to feedback.

The soft off circuit 42 of FIG. 1 can be provided in FIG. 3 by adjusting the values of a resistor R4 and capacitor C2, so that the second transistor Q2 operates in the active region during the final moments when switching off. This allows the secondary light source 18 to fade out rather than "snap" off giving occupants a slight warning that it is about to go out.

This secondary light function is particularly useful in a hallway or bedroom at night. When the last ambient room light (primary light source 20) is turned off when leaving a room or retiring to bed, this secondary light source 18 comes on automatically so that the occupant can see to make his way to another room or to bed. The secondary light source 18 becomes "the last light out."

Tests conducted on the secondary light assembly 16 of FIG. 3, with three AAA alkaline batteries 26, show that it could last more than a year when operated 3 times per day every day. Tests also show that the secondary light source 18 of FIG. 3 will not activate unless the primary light source 20 is suddenly reduced, such as turning off a room light, and the room must be sufficiently dark when the room lights are turned off. Thus, normal sun-up and sun-down will not trigger the secondary light assembly 16, further conserving the batteries 26. Also when a room light is turned off in the daytime (the room is not sufficiently dark when the room light is off) the secondary light assembly 16 will not come on. The secondary light assembly 16 of FIG. 3 has been assembled in a very compact form. It is low cost and draws very little stand-by current (about 4.5 microamps) allowing long battery life and making a tiny throw-away package possible.

Figure 4:
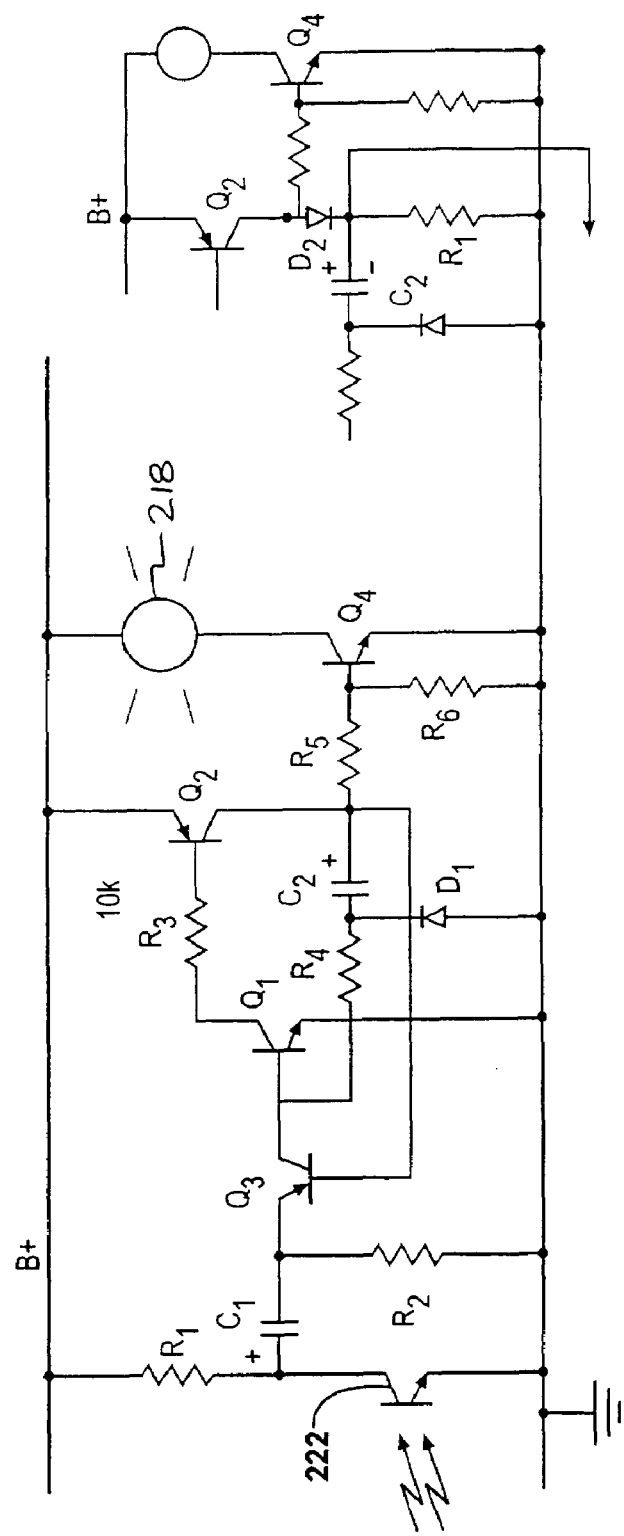
FIG. 4 is an electrical schematic of a third embodiment of the invention.

Referring to FIG. 4, a third embodiment of the invention is shown wherein like elements are offset from those of the first embodiment by 200. In this embodiment, the secondary light assembly 216 is designed to drive an incandescent lamp. A third transistor Q3 and a fourth transistor Q4 are added to accommodate the incandescent light 222 and some component values are different than those used in FIG. 3. This secondary light assembly 216 is designed to operate from a 3 volt supply and uses two 1.5 volt AA alkaline cells. The lamp typically draws 200 to 300 ma to provide enough light.

Since the lamp 218 is incandescent, it emits infrared radiation in the range of normal room lights 220. Therefore, the third transistor Q3 is added, if necessary, to isolate the switch from the turn-on transition of the lamp 218. In this manner, oscillations of the lamp, or secondary light source, 218 will not occur when the primary light source 220 is switched on. When the primary light source 220 turns on, the third transistor Q3 turns off and the emitter of the third transistor Q3 goes negative because the light sensor 222 is partially switched on by the light and the first capacitor C1 discharges through the second resistor R2. This provide a short time delay assuring that the secondary light source 218 is not turned back off. When the secondary light source 218 turns off, the light sensor 222 turns off (because of light feedback) and starts charging the first capacitor C1 through first and second resistors R1, R2 The voltage on the emitter of the third transistor Q3 remains below the base-emitter forward voltage threshold (0.4 to 0.6 volts) because the change in light level is not sufficient to generate a high enough emitter voltage on the third transistor Q3. A fourth transistor Q4 is added in FIG. 4 to provide current gain so that the incandescent lamp can be used in place of the LED shown in FIG. 3.

Figure 5:
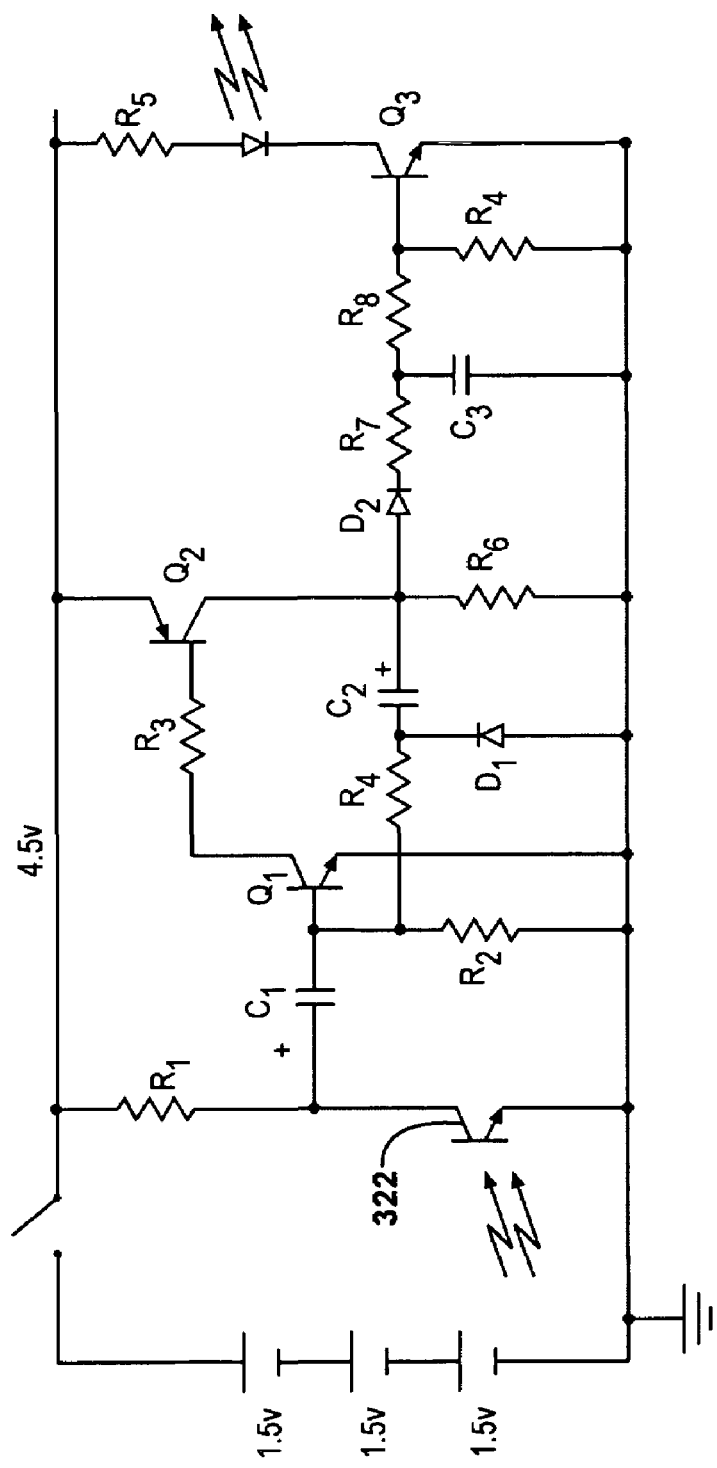
FIG. 5 is an electrical schematic of a fourth embodiment of the invention.

FIG. 5 is a fourth embodiment of the secondary light assembly with the added auxiliary function of an independent "soft-off" feature. This feature causes the secondary light assembly 316 to turn off gradually, giving an occupant advanced warning that it is about to go completely off. The soft off circuit 342 is a timer implemented with the components D2, R7, C3, R8, R9, and Q3. When the secondary light assembly 316 turns on, the third capacitor C3 charges up rapidly through the second diode D2 and a seventh resistor R7. When the second transistor Q2 turns off, a third capacitor C3 discharges through an eighth resistor R8 and the base of a third transistor Q3. The third transistor Q3 passes through its active region slowly as the base current from the third capacitor C3 diminishes, slowly reducing the current through the secondary light source 318 and turning it off gradually. The typical time from bright to off is about 6 to 10 seconds. The main timing function in this embodiment is the same as that shown in FIG. 3. The auxiliary "soft-off" timing function is completely independent of the main timing function, requiring the third capacitor C3 to implement.

Figure 6:
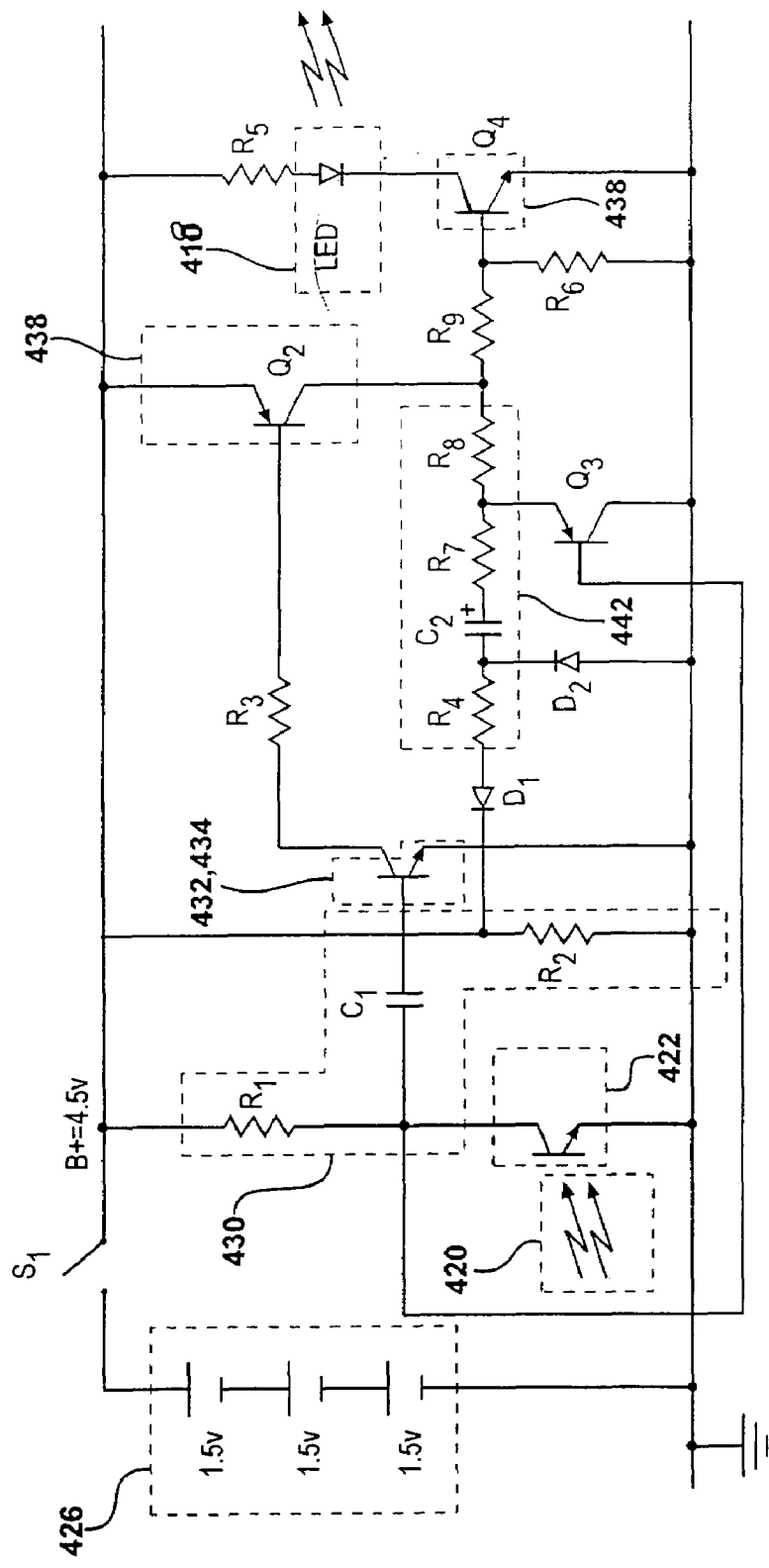
FIG. 6 is an electrical schematic of a fifth embodiment of the invention.

FIG. 6 shows a fifth embodiment of the secondary light assembly 416, which has a similar soft-off feature to that shown in the fourth embodiment of the invention, except it uses only one capacitor for both the normal on time and the time of the soft-off. The first diode D1 has been added to isolate the on-off light transition function from the secondary light source timer 436 because a fourth resistor R4 value as shown in FIG. 3 has been reduced to accommodate the much larger value for the second capacitor C2 required to perform the dual timing function. The transistor Q3 is added to provide the auxiliary function to turn off the secondary light source 418 when the primary light source 420 is turned back on while the secondary light source 418 is still on.

Figure 7:
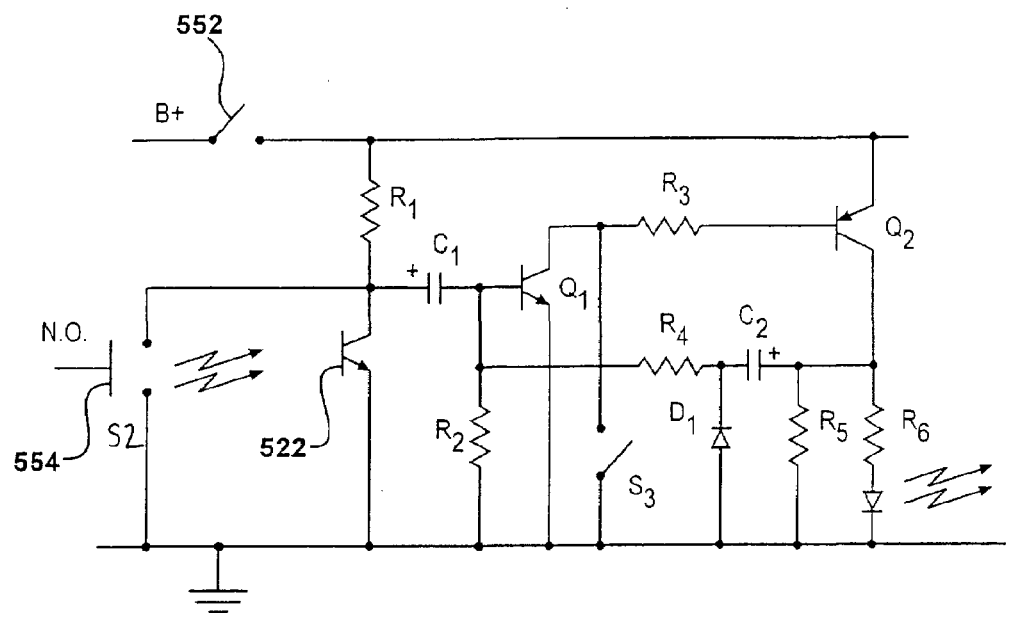
FIG. 7 is an electrical schematic of a sixth embodiment of the invention.

The secondary light assembly of FIG. 7 is the same as FIG. 3, except for auxiliary switches S2 and S3. Auxiliary switch S2 allows the operator of the night light to turn on the night light manually, which then continues providing light until it times out (approximately 45 seconds). Where a flashlight is needed in emergencies, the secondary light assembly 516 can be used by manually closing the auxiliary switch S3. It can be turned off again by opening the auxiliary switch S3.

Figure 8:
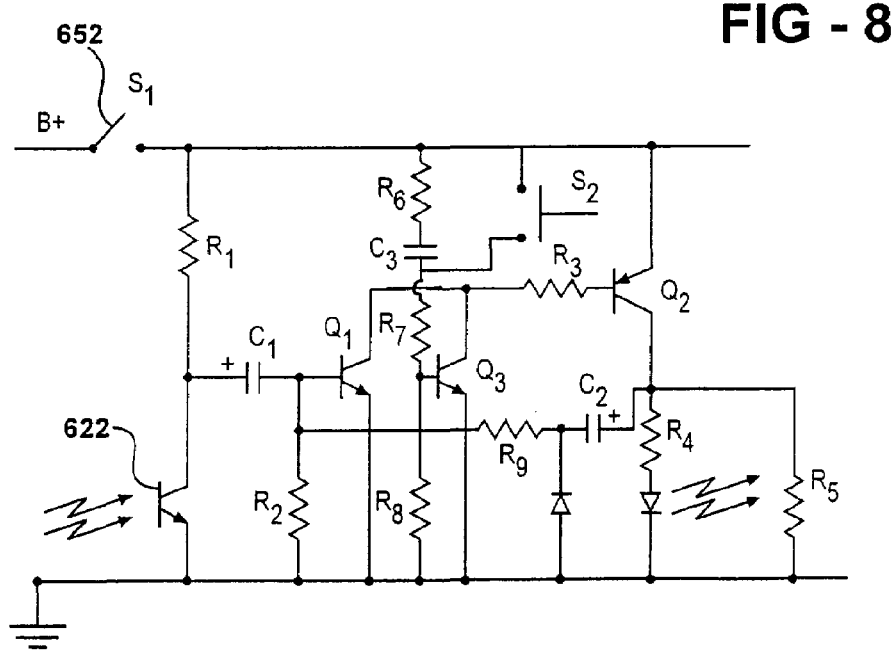
FIG. 8 is an electrical schematic of a seventh embodiment of the invention.

The secondary light assembly of FIG. 8 is like the one shown in FIG. 3 except it has an auxiliary timer. This is accomplished by configuring the third transistor Q3 in parallel with the first transistor Q1. Therefore, either of the transistors Q1, Q3 can activate the secondary light assembly 616. Closing the momentary switch S2 turns on the third transistor Q3 and starts the timing function. The amount of time that the second transistor Q2 is on is determined by a sixth resistor R6 and the third capacitor C3. This time constant is made much longer than the time constant created by the second capacitor C2 and resistor R9 so that the third transistor Q3 controls the maximum duration that the secondary light source 618 is on.

This secondary light assembly can then be used where a longer time period of light is required for an occupant's activity once it is initiated manually. An example might be when a person gets out of bed to go to the bathroom, he can press switch S2 to provide light needed and it will allow enough time and will go out automatically after he returns to bed. This timing function might be on the order of 2 to 5 minutes compared to the normal function of approximately 45 seconds. This longer timing function might be made adjustable by making R6 variable so that an occupant could tailor this timing feature to suit his own needs. Switch S2 could also be a remote controlled switch, such as a carpet switch operated by foot pressure, an infrared proximity switch, or some other remotely operated switch.

Figure 9:
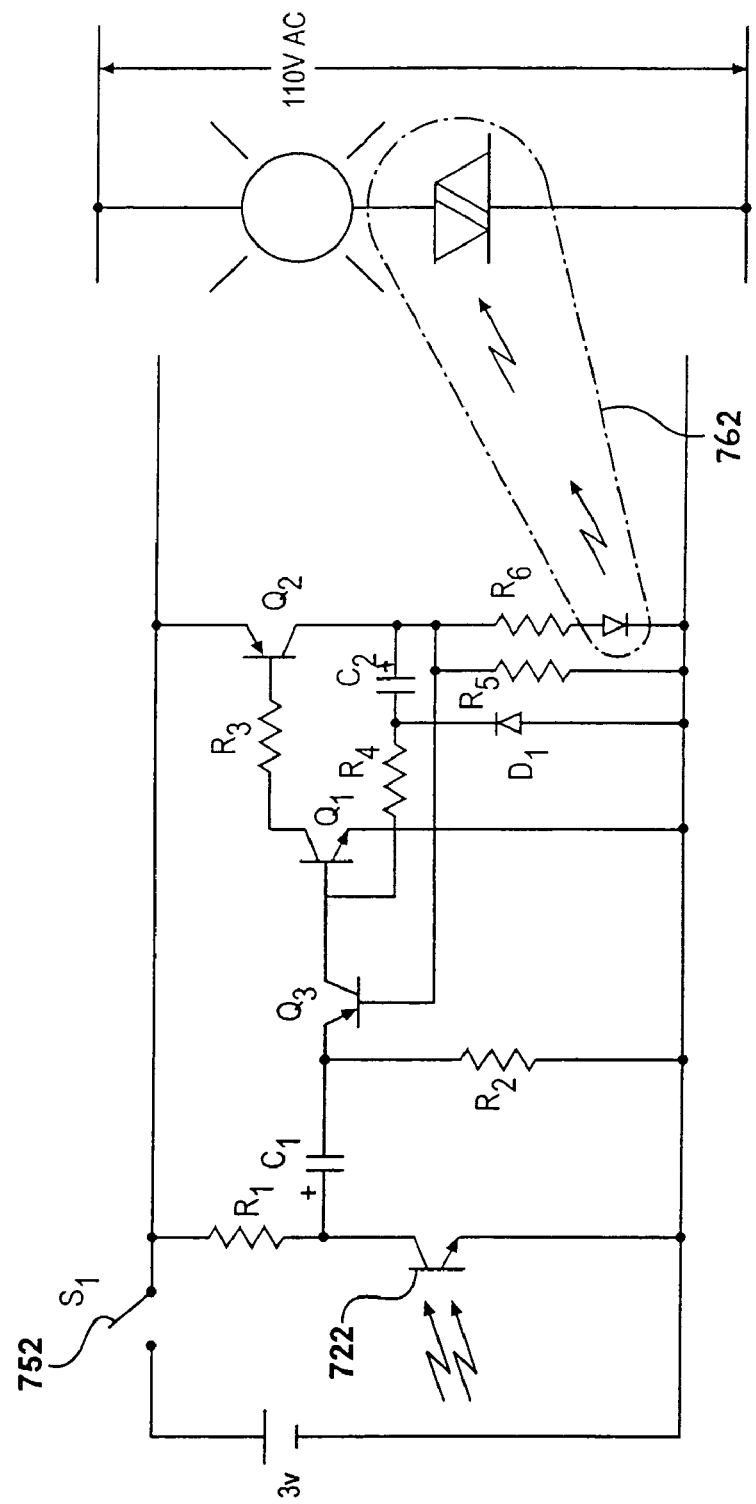
FIG. 9 is an electrical schematic of the first embodiment modified to drive an isolate AC powered secondary light source.

The secondary light assembly of FIG. 9 is similar to the embodiment shown in FIG. 4 except it can drive an isolated AC powered secondary light source. The secondary light source may be incandescent, electroluminescent, or gas discharge. The circuit function is the same as described for the secondary light assembly of FIG. 4, except a fourth transistor Q4 is replaced by an optocoupler 762, such as a phototriac. The main circuit is battery powered and completely electrically isolated from the AC circuit providing a high degree of safety. The infrared diode in the optocoupler constitutes the load for the battery side of the circuit. It requires only 2 to 5 ma to trigger the Triac. Thus battery life can be very long, enabling a throw-away product option. In this case the battery may be a small 3 volt lithium button cell with a long shelf life. If this secondary light assembly is used 3 times per night for 40 seconds each time it may last more than 4 years.

Figure 13:
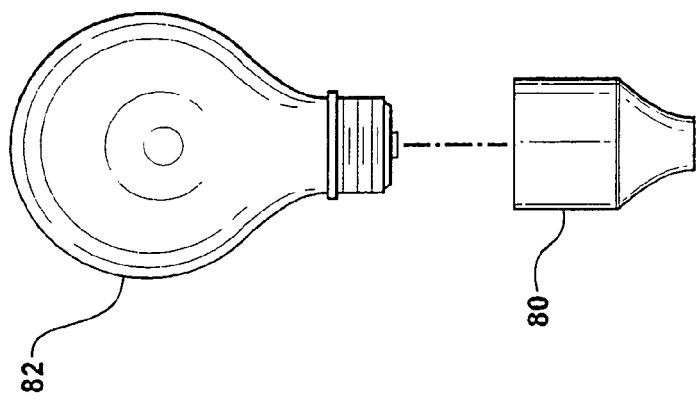
FIG. 13 is an exploded perspective view of the tenth embodiment of the invention with an incandescent light bulb.

As is shown in FIG. 13, the lamp could be replaced by a plug receptacle 80, allowing a remote light to be plugged into the light control logic. The secondary light assembly could be mounted in a wall switch to drive a small auxiliary light or place the Triac switch in parallel with the main light switch in order to turn on the main light automatically for a few seconds after it has been turned off manually. The entire unit could be compact and plug directly into a receptacle or it could be mounted remotely from the receptacle, and be connected by a cord.

If battery life is not a major concern, then the first capacitor C1 could be eliminated. This would cause the secondary light assembly to come on whenever the room is darkened to some minimum level, regardless of how fast this occurred. It would come on when the sun went down or when someone gradually closed a door or curtains for example. This may be annoying, but because of the very low load on the battery with this embodiment it may be acceptable.

Figure 10:
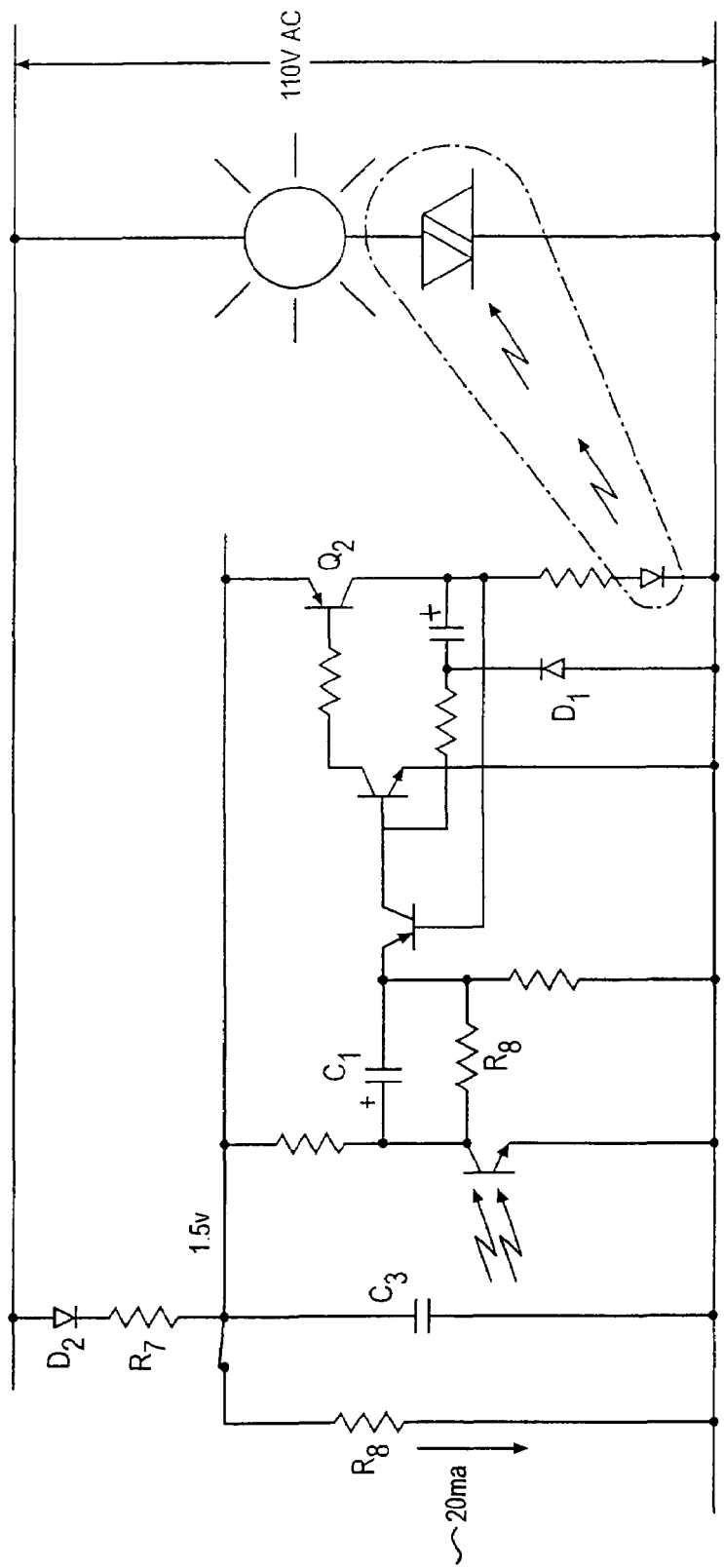
FIG. 10 is an electrical schematic of a eighth embodiment of the invention.

The secondary light assembly embodiment of FIG. 10 has the same function as shown and described above in and shown in FIG. 9, except the battery has been replaced by a rectified AC power supply composed of second diode D2, seventh resistor R7, eighth resistor R8 and the third capacitor C3. Extra filtering and regulation may be added as required. This example uses the phototriac coupling. However, it could drive the gate of a triac directly from the second transistor Q2. The advantage of this example is that no battery is required. Also, the eighth resistor R8 could be added to reduce noise and false triggering due to the AC line or the first capacitor C1 could be eliminated as described above. Safety is a bigger issue with this circuit as compared to the above example (FIG. 9) because of the direct connections of the light control logic to the AC line.

Figure 15:
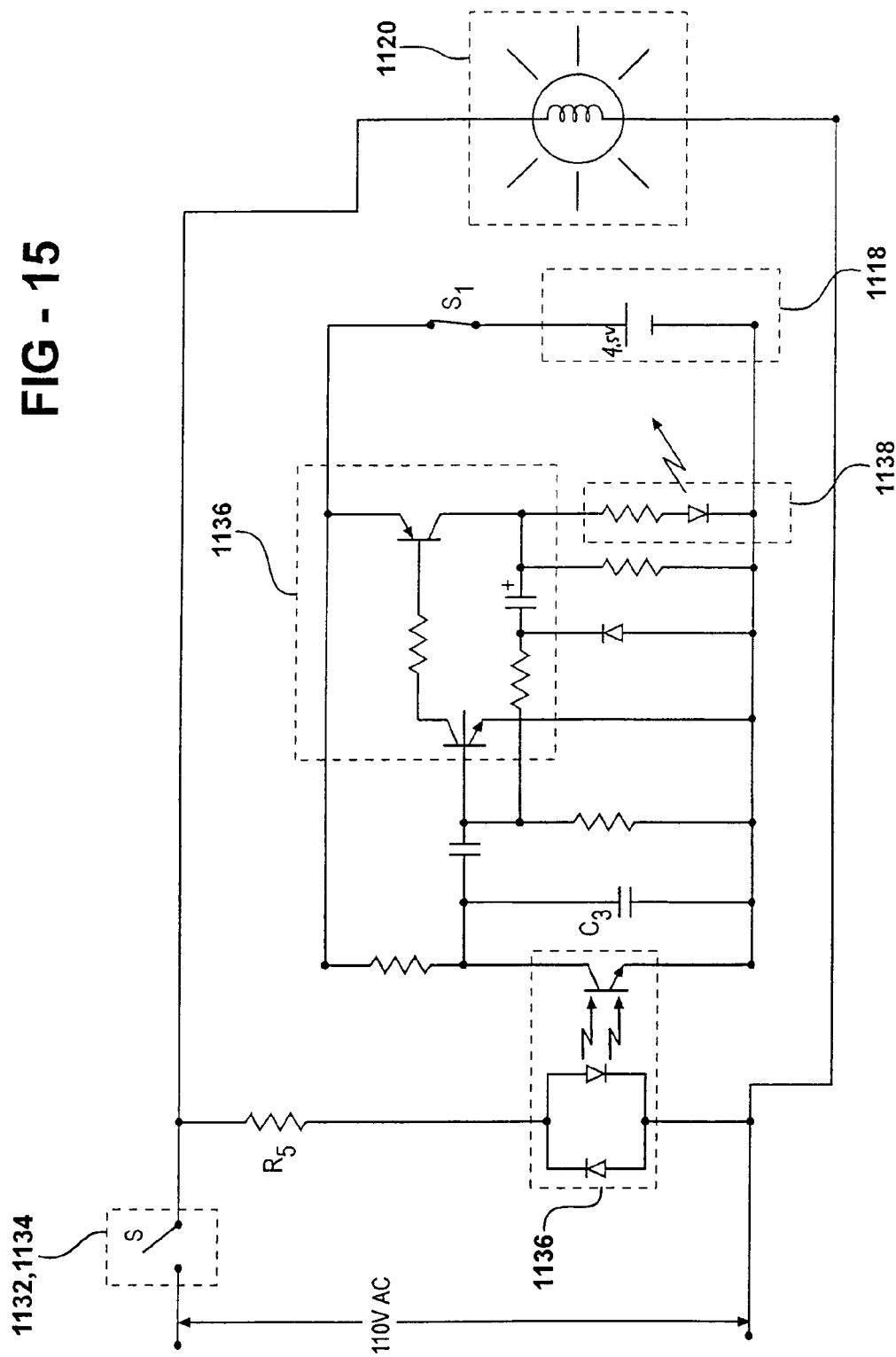
FIG. 15 is an electrical schematic of a twelfth embodiment of the invention.

FIG. 15 shows an embodiment of a secondary light assembly that senses the opening of a primary light switch 1132 which controls the primary light source 1120. An on-off detection circuit consists of an AC infrared/phototransistor switch which senses the opening of the switch S. The secondary light source timer 1136 is the same as shown in FIG. 1 and is battery powered. The secondary light source 1138 is an LED. The secondary light assembly 1116 is completely electrically isolated from the main AC Power source which controls primary light source 1120.

Figure 11:
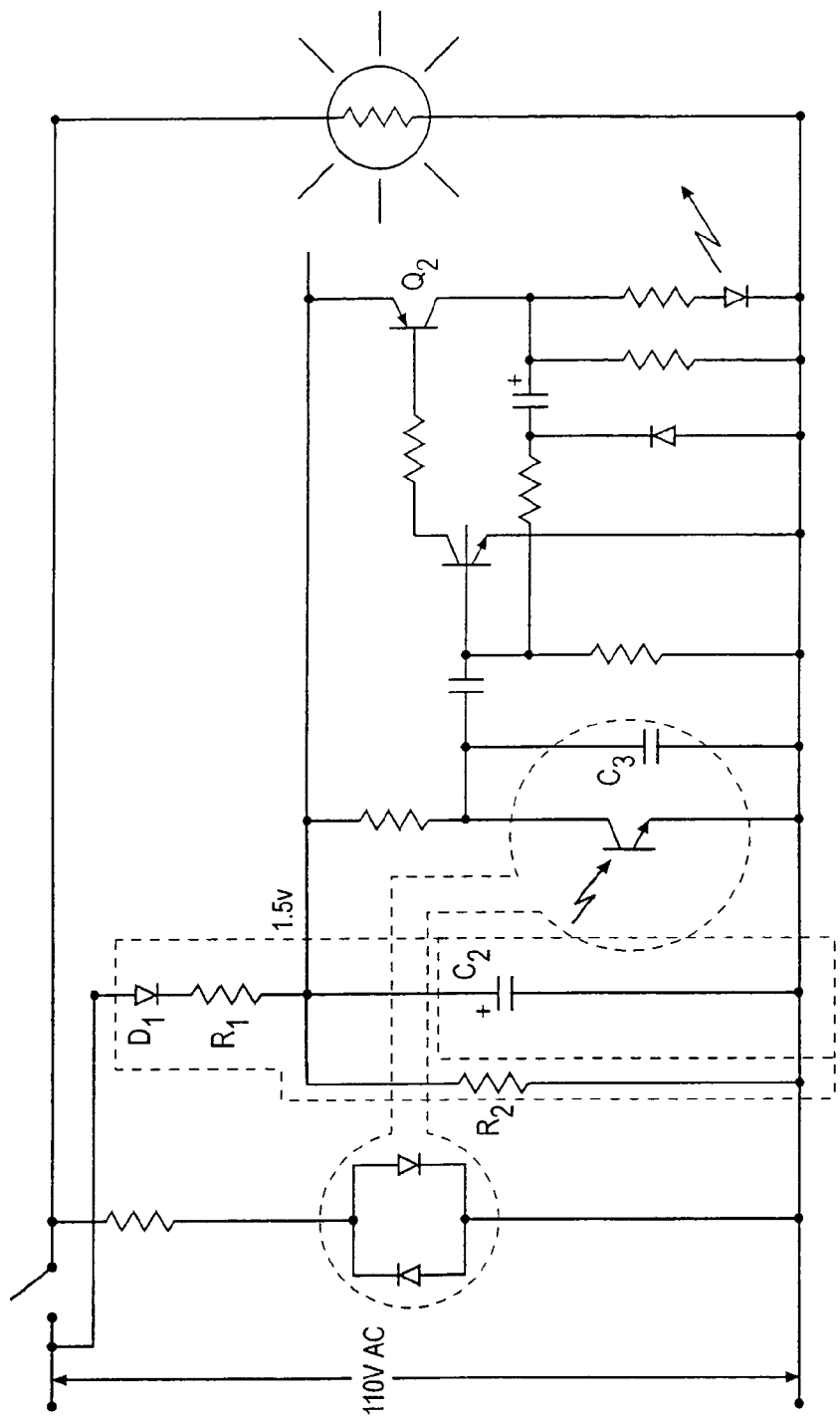
FIG. 11 is an electrical schematic of a ninth embodiment of the invention.

FIG. 11 is an embodiment of a secondary light assembly similar to that which is shown in FIG. 15 except it has an AC rectified power source consisting of D1, R1, R2, and C2 bypassing switch S and connected directly to the high side of the AC power line. This configuration replaces the battery shown in FIG. 15.

Figure 12:
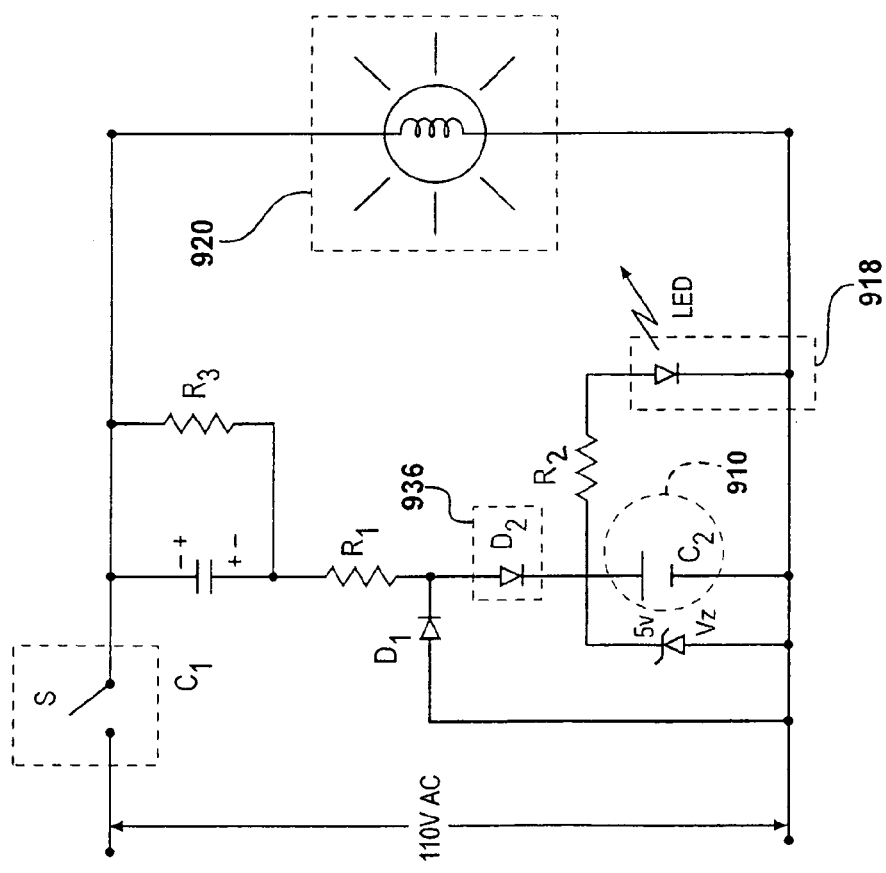
FIG. 12 is an electrical schematic of a tenth embodiment of the invention.

FIG. 12 shows an embodiment of a secondary light assembly which is on at the same time that the primary light source is on. It remains on for a fixed period of time following the opening of a switch S which turns off the primary light source 920. The secondary light source 918 is an LED. The light output of the LED is small compared to the ambient light and therefore is not noticed until the ambient light is turned off. When the ambient light is on, a super capacitor C2, such as a Panasonics electric double layer capacitor, having a value of from about 0.1 to 1.0 farad is charged through C1, R1, and D2. A Zener diode, 71, is used to maintain the voltage on C2 at about 5 volts DC. Diodes D1 and D2 allow C1 to pass the AC current and drop the AC line voltage down to an acceptable level before rectifying it to charge C2. Resistor R1 prevents a transient current from damaging other circuit components when switch S is closed. R3 is a large resistance (could be a meg Ohm) that discharges C1 when switch S is opened, thus preventing any voltage build up on C2 that could cause injury to a person when disconnecting the secondary light assembly from an electrical socket. When switch S is opened, capacitor C2 discharges through R2 and the LED night light source until the super capacitor C2 is discharged below the forward voltage of the LED. In this way a subdued momentary light source is provided after the main ambient light source is turned off. It is important to note that this action is fully automatic requiring no special operator intervention. For example, when leaving a room or going to bed at night the ambient room light is normally switched off and the function of the secondary light assembly continues automatically.

This embodiment requires few components and can be packaged in an adapter (as illustrated in FIG. 13) that supports the primary light source, an incandescent bulb 82 in FIG. 13. Multiple units could be used in a room to guarantee the secondary light assembly function regardless of which ambient light is turned off last. This function can also be easily built into a lamp or ceiling light, a switched wall receptacle, or a wall switch plate.

Figure 14:
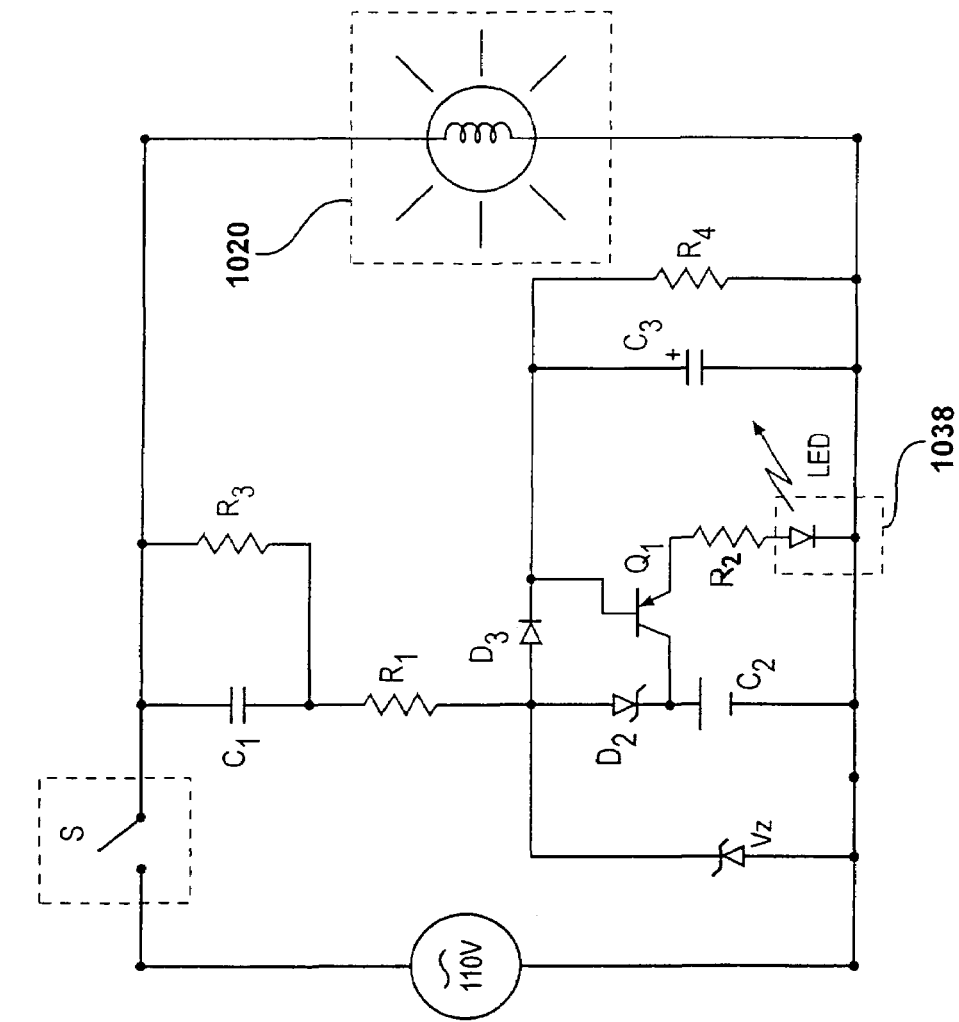
FIG. 14 is an electrical schematic of an eleventh embodiment of the invention.

The secondary light assembly embodiment shown in FIG. 14 is similar to that shown in FIG. 12 except the LED night light source is kept off by the action of Q1 when the switch S is closed and the ambient light source is on. D3, R4, and C3 provide a rectified DC voltage to keep the base of Q1 high until S is opened. When S is opened, the ambient light goes off, C3 discharges rapidly through R4, Q1 turns on, and the super capacitor C2 is connected by Q1 to R2 and the LED night light source. The LED then comes on for a predetermined time and fades out slowly ("soft-off") as super capacitor C2 discharges through R2 and the LED night light source (8). In this example, Vz also performs the function of D1 in FIG. 10. The on-off detection function is performed by the switching action of Q1, while the night light "on" timer function is performed by C2 and R2.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A secondary light assembly light for emitting light into an area lit by a primary light source, said secondary light assembly comprising:
    a light sensor for sensing light emitted from the primary light source;
    a secondary light source operatively connected to said light sensor; and
    a controller electrically connected to said light sensor and said secondary light source, said controller calculation a rate of change of light emission from the primary light source such that said controller turns on said secondary light source when the rate of change of light emission from the primary light source is above a predetermined rate threshold, said controller including a timer to measure an amount of time beginning when said controller turns said secondary light source on and a reset switch for turning said secondary light source off when said timer times out after a time equal to said amount of time.

2. A secondary light assembly as set forth in claim 1 wherein said controller include a soft off circuit for ramping down the unit emitted by said secondary light source at a ramp down rate that is less than said predetermined rate threshold.

3. A secondary light assembly as set forth in claim 1 wherein said light sensor defines a range in an electromagnetic wavelength spectrum that is sensed by said light sensor.

4. A secondary light assembly as set forth in claim 3 wherein said secondary light source emits light outside said range defined by said light sensor.

5. A secondary light assembly as set forth in claim 1 wherein said controller includes a primary switch port for receiving a signal from a primary light switch operatively connected to the primary light source, said controller activating said secondary light when the signal from the primary light switch indicates the primary light was turned off at a rate greater than said predetermined rate threshold.

6. A secondary light assembly as set forth in claim 5 wherein said controller includes an OR gate for activating said secondary light when the primary light switch is turned off or when said controller calculates the rate of change of light emission to be above said predetermined rate threshold.

7. A secondary light assembly as set forth in claim 6 including a manual on switch for turning said secondary light source on independently of activity of the source.

8. A secondary light assembly as set forth in claim 1 including an isolation switch for preventing light emitted from said secondary light source to be incorporated into the calculation by said controller when measuring the rate of change of light emission.

9. A secondary light assembly as set forth in claim 8 including an adjuster for adjusting said timer and the time during which said secondary light source is on.

10. A secondary light assembly for emitting light into an area lit by a primary light source, said secondary light assembly comprising:
    a light sensor for sensing light emitted from the primary light source;
    a secondary light source operatively connected to said light sensor;
    a controller electrically connected to said light sensor and said secondary light source, said controller calculating a rate of change of light emission from the primary light source such that said controller turns on said secondary light source when the rate of change of light emission from the primary light source is above a predetermined rate threshold; and
    a soft off circuit for ramping down the light emitted by said secondary light source at a ramp down rate that is less than said predetermined rate threshold.

11. A secondary light assembly as set forth in claim 10 wherein said controller includes a primary switch port for receiving a signal from a primary light switch operatively connected to the primary light source, said controller activating said secondary light when the signal from the primary light switch indicates the primary light was turned off at a rate greater than said predetermined rate threshold.

12. A secondary light assembly as set forth in claim 11 wherein said controller includes an OR gate for activating said secondary light when the primary light switch is turned off or when said controller calculates the rate of change of light emission to be above said predetermined rate threshold.

13. A secondary light assembly as set forth in claim 12 including a manual on switch for turning said secondary light source on independently of activity of the primary light source.

14. A secondary light assembly as set forth in claim 13 including an isolation switch for preventing light emitted from said secondary light source to be incorporated into the calculation by said controller when measuring the rate of change of light emission.

15. A secondary light assembly as set forth in claim 14 including an adjuster for adjusting said timer and the time during which said secondary light source is on.

16. A secondary light assembly for emitting light into an area lit by a primary light source, said secondary light assembly comprising:
    a light sensor for sensing light emitted from the primary light source;
    a secondary light source operatively connected to said light sensor;
    a manual switch operatively connected to said secondary light source for turning said secondary light source on and off;
    a controller electrically connected to said light sensor, said secondary light source and said manual switch, said controller operating said manual switch to turn on said secondary light source a first predetermined time when said light sensor senses the turning off of the primary light source;
    and a normally open momentary contact switch electrically connected to said secondary light source for turning on said secondary light source a second predetermined time greater than said first predetermined time when said manual switch is closed.

17. A secondary light assembly as set forth in claim 16 wherein said controller includes a rate of light chance circuit for measuring a rate of change of light emission from the primary light source.

18. A secondary light assembly as set forth in claim 17 including a rate threshold switch to compare the rate of change of light emitted from the primary light source to a threshold rate.

* * * * *

UNITED STATES PATENT AND TRADEMARK OFFICE
CERTIFICATE OF CORRECTION

PATENT NO. : 7,253,570 B2
APPLICATION NO. : 10/935769
DATED : August 7, 2007
INVENTOR(S) : John Alfred Ayres Page 1 of 1

It is certified that error appears in the above-identified patent and that said Letters Patent is hereby corrected as shown below:

In the Drawings:
Sheet 2, Fig 2, add the reference numeral --116-- to refer to the secondary light assembly.
Sheet 3, Fig 3, add the label --Q2-- to the pnp transistor.
Sheet 7, Fig 7, add --S3-- at switch 552.
Sheet 12, Fig 14, the collector and the emitter of Q1 should be interchanged and the symbol for D2 should be changed from a zener diode to a regular diode, identical to D3.

In the Specification:
column 2, line 64, replace the word "bind" with the word "blind".
column 3, line 22, replace the numeral "26" with the numeral "24".
column 3, line 23, replace the word "is" with the word "as".
column 3, line 27, replace the word "is" with the word "as".
column 3, line 45, replace the word "throws" with the word "activates".
column 4, line 53, replace the word "active" with the word "activate".
column 6, line 67, replace the numeral "222" with the numeral "218".
column 9, line 2, remove the word "in".
column 10, line 15, replace the numeral "8" with the numeral "1038".
column 10, line 16, replace the numeral "10" with the numeral "12".

In the Claims:
claim 1, line 28, remove the fifth word "light", and in line 36, replace the word "calculation" with the word "calculating".
claim 2, line 49, replace the word "unit" with the word "light".
claim 16, line 25, add the word --with-- between the words "operating" and "said," and in line 27, replace the word "when" with the word "after".
claim 17, line 35, replace the word "chance" with the word "change".

Signed and Sealed this
Twenty-eighth Day of May, 2013

Teresa Stanek Rea
*Acting Director of the United States Patent and Trademark Office*